United States Patent
Kothari et al.

(10) Patent No.: US 8,275,855 B2
(45) Date of Patent: Sep. 25, 2012

(54) METHOD AND SYSTEM FOR MONITORING REST WEB SERVICES

(75) Inventors: Pankaj Kothari, Bangalore (IN); Venkata Krishnan Ramamoorthy, Bangalore (IN); Sidharta Seethana, Bangalore (IN)

(73) Assignee: Yahoo! Inc., Sunnyvale, CA (US)

(*) Notice: Subject to any disclaimer, the term of this patent is extended or adjusted under 35 U.S.C. 154(b) by 202 days.

(21) Appl. No.: 11/961,006

(22) Filed: Dec. 20, 2007

(65) Prior Publication Data
US 2009/0164621 A1 Jun. 25, 2009

(51) Int. Cl.
*G06F 15/173* (2006.01)
(52) U.S. Cl. .................. 709/218; 709/224
(58) Field of Classification Search .......... 709/224, 709/203, 217–219; 705/26
See application file for complete search history.

(56) References Cited

U.S. PATENT DOCUMENTS

| | | | |
|---|---|---|---|
| 7,028,223 B1* | 4/2006 | Kolawa et al. .......... 714/38 |
| 2002/0174421 A1* | 11/2002 | Zhao et al. ............. 717/174 |
| 2005/0165656 A1* | 7/2005 | Frederick et al. ........ 705/26 |
| 2006/0015463 A1* | 1/2006 | Gupta et al. ............ 705/52 |
| 2008/0133739 A1* | 6/2008 | Zuzga et al. ........... 709/224 |
| 2009/0006614 A1* | 1/2009 | Le et al. ............... 709/224 |
| 2009/0018811 A1* | 1/2009 | Paradkar et al. ......... 703/22 |

* cited by examiner

*Primary Examiner* — Ian N Moore
*Assistant Examiner* — Thai Nguyen
(74) *Attorney, Agent, or Firm* — Seth H. Ostrow; Ostrow Kaufman LLP (57) ABSTRACT

Generally, the present invention provides a method and computerized system for monitoring REST web services including generating a REST based web service client call operative to be used for monitoring web service activities. The web service client call is then deployed. The method and computerized system further includes monitoring the web service activities via the call invocation and a response analysis. The method and computerized system further includes receiving a plurality of feedback results from the monitoring of the web service functionality and thereupon adjusting the web service parameters based on the aggregated feedback.

20 Claims, 4 Drawing Sheets

METHOD AND SYSTEM FOR MONITORING REST WEB SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to monitoring web services and more specifically to a system and method for providing the monitoring and tracking of REST-based web services in accordance with service level agreements.

BACKGROUND OF THE INVENTION

Representational State Transfer (REST) architecture allows for the distribution of hypermedia within the constraints of existing standard web-based protocols and encoding for existing operations. REST architecture is, in essence, a hybrid programming style derived from various network-based architectural styles as well including a uniform connector interface. REST includes the four interface constraints of identification of resources, manipulation of resources through representations, self-descriptive messages, and hypermedia as the application state.

REST web services provide easier and intuitive interfaces that ease the development of applications interacting with the service. Although, it is important when providing these features for the active monitoring of quality of the transmission of the transactions. It is typical for parties to have Service Level Agreements (SLAs) that define various factors associated with the services provided for potential service consumers and it is important to monitor various factors associated with the transactions to ensure conformity with the correspond SLAs, such as to monitor the availability of access to the requested data and the response time in which a data request (e.g. requesting a resource representation) is answered.

Additionally related to monitoring resources and services are fault handling operations. The quality and effectiveness of REST web services can be very important in commercial grade web service APIs, therefore it is very important to not only monitor the REST web service levels, but also provide the ability to correct or otherwise conform resources within the terms of the service level agreements.

As such, there exists a need for the active monitoring of REST web service activities without the computation and resource overhead of continuous monitoring techniques.

SUMMARY OF THE INVENTION

Generally, the present invention provides a method and computerized system for monitoring REST web services including generating REST based web service client calls operative to be used for monitoring web service activities. The web service client call is then deployed. The method and computerized system further includes monitoring the web service activities via the call invocation and a response analysis. The method and computerized system further includes receiving a plurality of feedback results from the monitoring of the web service functionality and thereupon adjusting the web service parameters based on the aggregated feedback.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
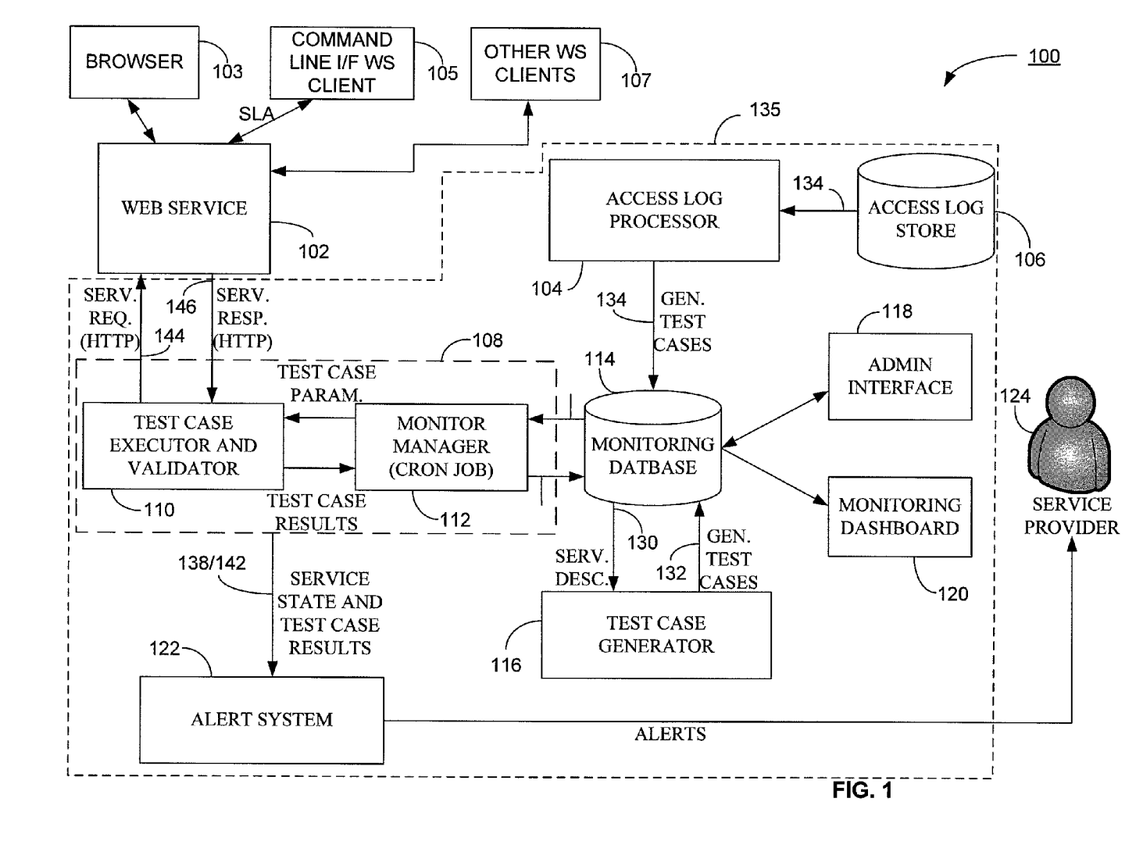
FIG. 1 illustrates a block diagram of a computing system providing for monitoring REST web services in accordance with one embodiment of the present invention.

FIG. 1 illustrates one embodiment of a computing system 100 including a browser 102, an access log processor 104, an access log store 106, a test processor 108, which includes a test case executor and validator 110 and a monitor manager 112. The system 100 further includes a monitoring database 114, a test case generator 116, an administrative interface 118, a monitoring dashboard 120 and an alert system 122 for communication with a service administrator 124.

The web service clients, including a browser 103 and command line interface clients 105, can interact with the web service across a networked connection (e.g. Internet) using HTTP as a protocol for communication. More generally, the web service 102 represents a data transmission point whereupon a service is provided, or operative to be provided upon further processing, to the service clients. The SLAs are metrics that a service provider provides to the service consumer, such as response time of the service, up time of the service, etc. The consumers use web service clients to interact with the web service and the service administrator monitors these parameters and makes sure the service complies to the agreed terms of the SLA. In other words, the SLAs are between the service provider and consumer and it is maintained by the service administrator.

The access log processor 104 and the test case executor and validator 110 and monitor manager 112 in the test processor 108 may be one or more processing devices operation to perform computational processing operations in response to executable instructions. The monitoring database 114 and access log store 106 may be one or more data storage devices operative to store corresponding data therein. FIG. 1 further illustrates the monitoring system 135 that includes processing elements and interface components as described herein for communication with the web service 102 and subsequent elements 103, 105 and 107.

The alert system 122 may include one or more processing components operative to perform alerting operations in response to alert conditions, as recognized by one having ordinary skill in the art. The test case generator 116 may be a processing component or system operative to, in response to executable instructions, generate test cases usable for the monitoring calls as described herein. The administrative interface 118 and the monitoring dashboard 120 may provide for the display of components, in response to programming instructions, for generating and displaying the information, where the interface 118 and dashboard 120, upon being displayable on one or more display devices, are operative to provide corresponding information to the service administrator 124.

In this system 100, the administrative interface 118 helps service owners add services for monitoring, describes the services, defines test cases, specifies frequency to run the test cases and configures alerts. As described in further detail below, the test cases provide for detecting a service level. The administrative interface 118 operates in response to executable instructions on a local or remote processing device (not explicitly shown) wherein the service administrator 124 may perform the various operations using the interface. The addition of services for monitoring may include selecting different aspects of the web service provided to the web service clients, such as defined by the SLA, for example testing response speed and/or bandwidth parameters. The configuration of alerts may include defining which types of alerts to generate, such as ranking different types of alerts and having different actions for the different alerts, such as low-level alerts that include a simple electronic mail notification and high-level alerts including a more urgent notification. The admin interface 118 is also in operative two-way communication with the monitoring database 114.

The test case generator 116 is operative to, in response to executable instructions, handle automatic test case generations. The generator 116 reads a service description 130 from the monitoring database 114 and generates the test case from the description, constructs the REST service requests and indicates the expected response 132. For example, one technique may include generating a resource lifecycle test case based on the service description 130 from the database 114. Service descriptions are provided by the service administrator through the admin interface. These give details about a service like the response formats supported by the service, request construction details, etc. These could be standard web service description languages, such as WSDL, or proprietary service description formats.

The access log processor 104 is operative to, in response to executable instructions, also generate test cases 134, similar to the test case generator 116. The access log processor 104 gets the access log for services from the access log store 106, reads random requests from the access log, executes the requests and stores the results in the monitoring database.

The monitor manager 112 is a processing module operative on one or more processing devices, and is a cron job that runs at a predefined time interval, such as running once every minute. The manager 112 retrieves the service description and a list of test cases 136 from the monitoring database 114, where the list of test cases include test cases to be run in the next instance. In one embodiment, each test case has an associated priority. If a stopper test case is encountered, other test cases for the service are not executed. For every test case, the corresponding test case executor and validator is invoked and the results are obtained. This component 112 manipulates the service state based on the test case results 138. The service state is updated in the database and also sent to the alert system 122.

The monitor manager 112 invokes the test case executor and validator 110. A test case executor and validator 110 is written for each test case, including reading test case parameters 140, wherein the module then makes REST service requests and compares the actual response with an expected response. The text case executor and validator 110 then returns the test case results 142 to the monitor manager 112 and the alerts system 122.

Every test case has an associated test case executor and validator 110, which will be invoked by the service monitor 112. One aspect may include a ping check, which invokes the service with a sample call in the service request 144 to check if the service is alive and returns a valid HTTP code in the service response 146. This ping check can be defined as a stopper case, holding the highest execution priority. The test case executor and validator communicates with the service using the HTTP protocol for request and response.

In one embodiment, the test case executor and validator 110 can be used to validate the service response 146. The response 146 can be checked for full or partial text match by defining appropriate regexes. This can also be used to check if there are "n" elements in the response, for example ten search results, by defining regex and the number of expected matches.

Another embodiment may include a response format equivalence test, wherein the test case executer and validator 110 converts the service response in various formats into a common format, such as PHP arrays for example, and compares these for equivalence.

For resource oriented services, the test case executor and validator may automatically generate web service calls based on the service description. The test case executor and validator may create a resource using the PUT verb, get the resource using the GET verb, alter the resource using the POST verb, get the resource using the GET verb, and drops the resource using the DELETE verb. The system may thereupon check the http codes returned and the response content in each of these steps.

One technique may include an idempotence check through access log requests from the access log store 106. This adapter uses these request/responses, replays the request and compares the current output with the stored output.

The access log processor 104 is operative to, in one embodiment, populate the database 114 with requests and responses of the test cases 134. The system 100 may use these request/responses to replay the request and compare the current output with the stored output. This thereupon provides another technique for determining a system-level operating efficiency by providing, with idempotent services, verifying correctness and consistencies.

Figure 2:
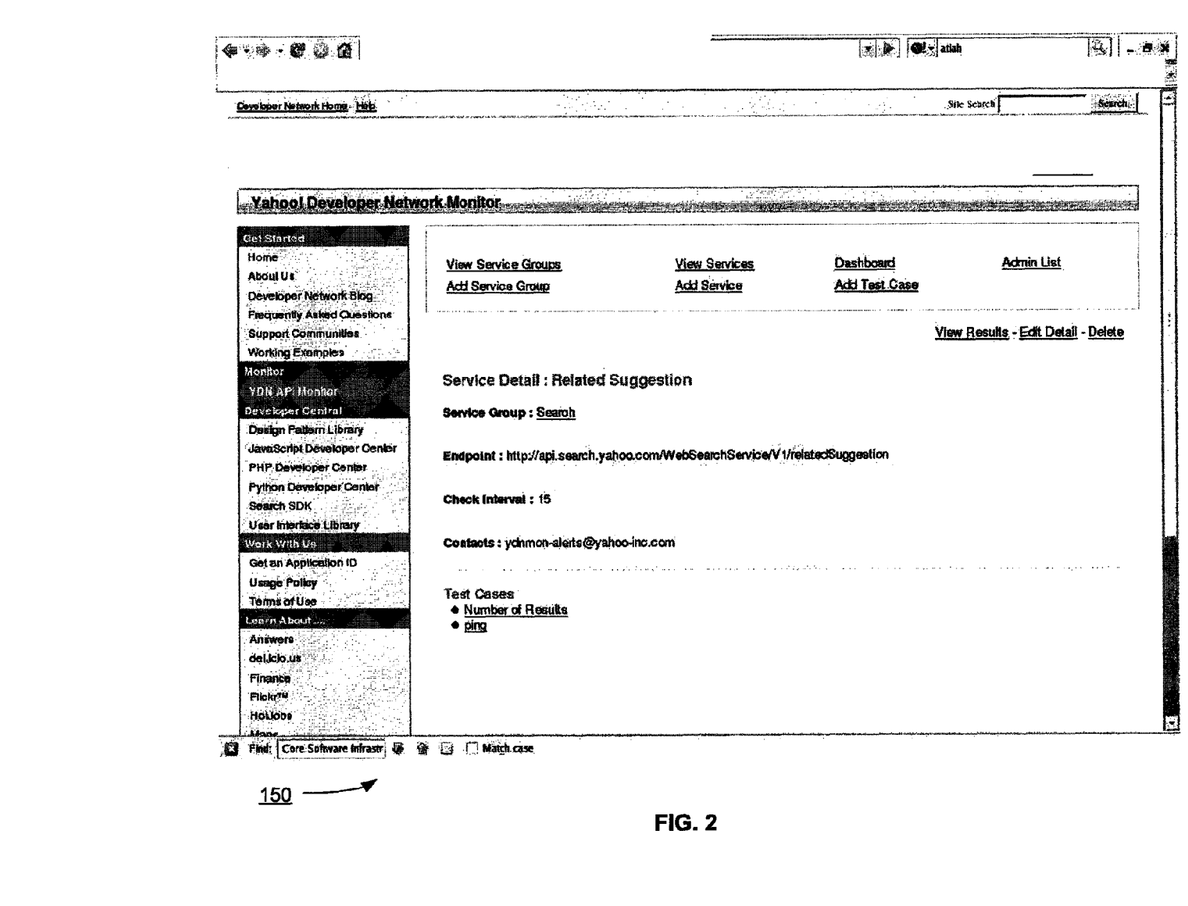
FIG. 2 illustrates a sample screen shot of an administrative interface relating to the system providing for monitoring REST web services in accordance with one embodiment of the present invention.

FIG. 2 illustrates a sample screenshot of an administrative interface 150, such as processed by the interface processing component 118 of FIG. 1. The interface 150 provides communication between the service administrator 124 and the monitoring database 114, as illustrated in FIG. 1. The sample screenshot provides an exemplary display of interface functionality that may be implemented by underlying software executable code or electronic processing operations. In additional embodiments, the admin interface 150 may be used to define test cases, which as described below, provide for testing the REST based web services. The interface may also allow the admin to specify the frequency of the test cases and format the alerts that can be used to indicate issues with the services, such as if the services do not meet the SLA requirements.

Figure 3:
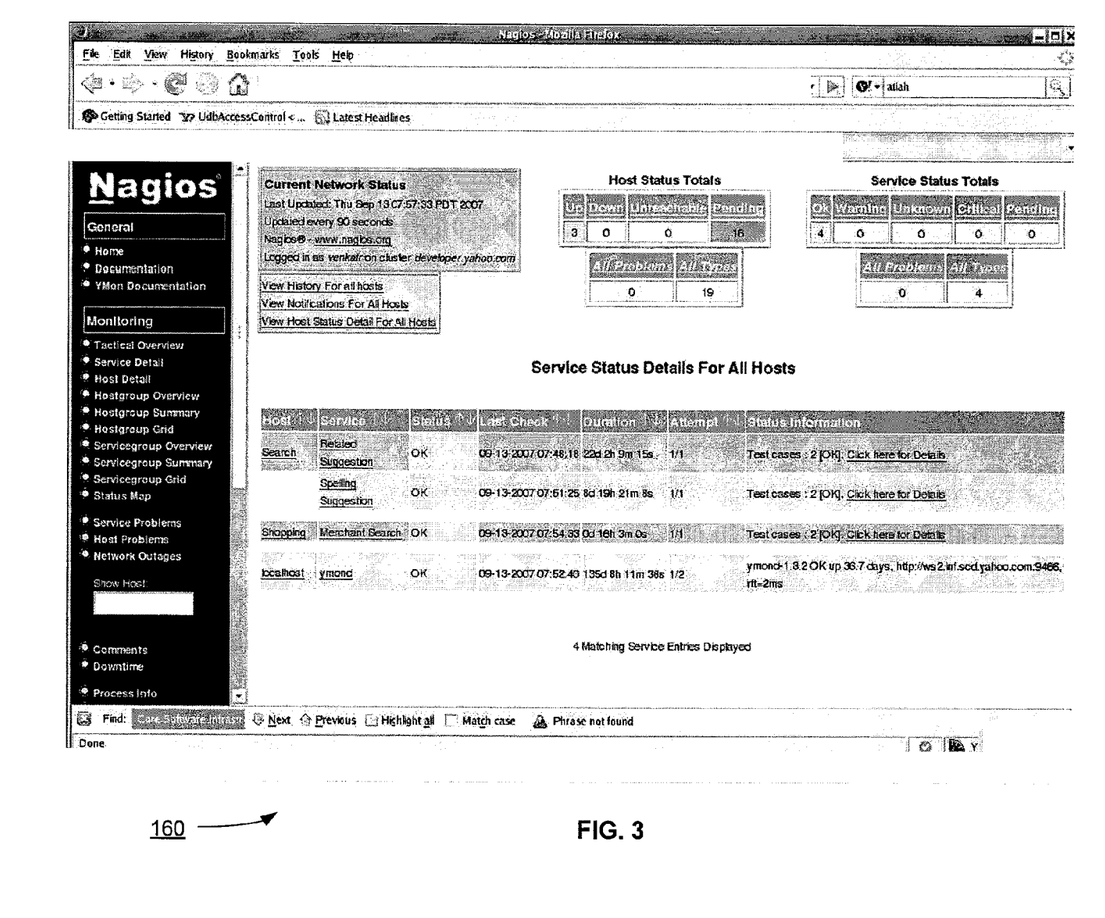
FIG. 3 illustrates a sample screen shot of a monitoring dashboard relating to the system providing for monitoring REST web services in accordance with one embodiment of the present invention.

FIG. 3 illustrates a sample screenshot of a monitoring dashboard 160, such as processed by the monitoring dashboard processing component 120 of FIG. 1. The dashboard 160 provides for a comprehensive visual display of network activities, such as from information from the monitoring database 114. As described herein, the dashboard information may relate to monitoring of web service activities in response to call invocation and response analysis operations. In one embodiment, the dashboard 160 may provide visual feedback of REST web service activities and the interface 150 provides for the service administrator to adjust or otherwise modify terms and/or conditions for REST based web services in response to the dashboard information. With respect to FIG. 1, these interactive operations may be performed through the admin interface 118 and the monitoring dashboard 120.

The computerized system for monitoring REST web services includes generating a set of monitoring calls and invoking the calls as part of a standard HTTP call invocation framework. However, monitoring call generation, invocation and analysis includes the following additional REST protocol specific aspects.

A first aspect is the ability to monitor different types of REST web services, including the ability to monitor services with various response formats, such as XML, JSON and serialized PHP. This further includes the ability to monitor both method oriented (pseudo-REST) and resource oriented REST services and the ability to monitor both form-POSTed as well as XML POSTed services.

A second aspect is the ability to auto-generate a suite of monitoring calls. One technique is based on a REST resource URI. REST web services, which are resource oriented, are marked by well structured URIs. A resource is acted upon using HTTP verbs: PUT to create, POST to update, GET to read and DELETE to destroy. A single resource URI can therefore generate a full suite of monitoring calls that can periodically test a complete life cycle of a REST service in production. Corresponding to each resource URI, four monitoring calls can be generated and applied to check that the REST web services are functioning correctly with respect to the ability to create the resource, modify it, read its state and destroy it. Another way to generate monitoring probes is to look at actual service requests in production and replay them. Responses can be compared to check consistency of service responses. This technique will work for idempotent service invocations.

A third aspect is the ability to check correctness of a response via a non-XML-specific validation technique because the response formats in REST could be in any of the various formats, such as, for example but not limited to XML, JSON, serialized PHP, among other formats. This aspect may include using regular expressions as a REST response matching mechanism, comparing actual versus expected results. This aspect may include the ability to match responses in terms of the number of occurrences of a particular element, for example a web search result for popular queries should return ten search results for a paginated web service API. This aspect may also include validation by converting service response in various formats, like PHP, JSON, serialized PHP, to a common format, like PHP data structures, and it is used for structural validation and value equivalence comparisons."

A fourth aspect is the ability to check performance, such as the responsiveness in terms of time taken to respond. This technique involves probing a REST web services automatically under different load conditions. A monitoring call can be sent to the service as load conditions vary. Monitoring of load conditions can be done by traditional monitoring methods, and this technique builds upon those by sending a monitoring probe under various load conditions to construct a response curve for the web service with variable load.

Figure 4:
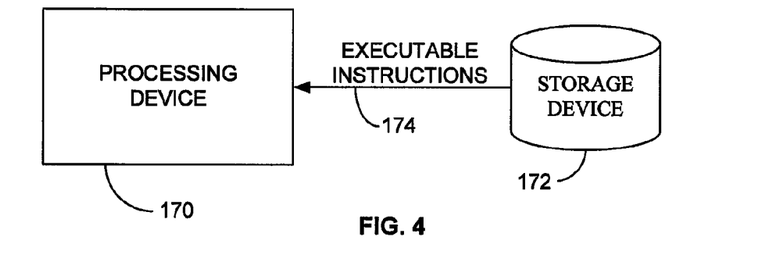
FIG. 4 illustrates a sample processing system operative to provide the computerized method described herein.

FIG. 4 illustrates one embodiment of a processing device 170 that is coupled to a storage device 172 having executable instructions 174 stored therein. The storage device, which may be any suitable type of storage device as recognized by one skilled in the art, stores these executable instructions therein. The processing device receives these instructions and is operative perform processing steps, such as the steps described in flowchart of FIG. 5 below.

The storage device 172 may be local or remote to the processing device, such as a local or embedded memory or a storage device accessible across a networked connection. The storage device 172, while shown as a single device, may also be a combination of multiple storage devices storing various aspects or components of the executable instructions 174 for receipt and processing by the processing device 170. The processing device 170 may be one or more processing devices in one or more processing locations, operative to receive the executable instructions and perform the processing operations as indicated therein. For example, one embodiment may include multiple processors at various processing locations performing different processing operations in responses to modules or portions of the executable instructions, as received from the storage device 172.

Figure 5:
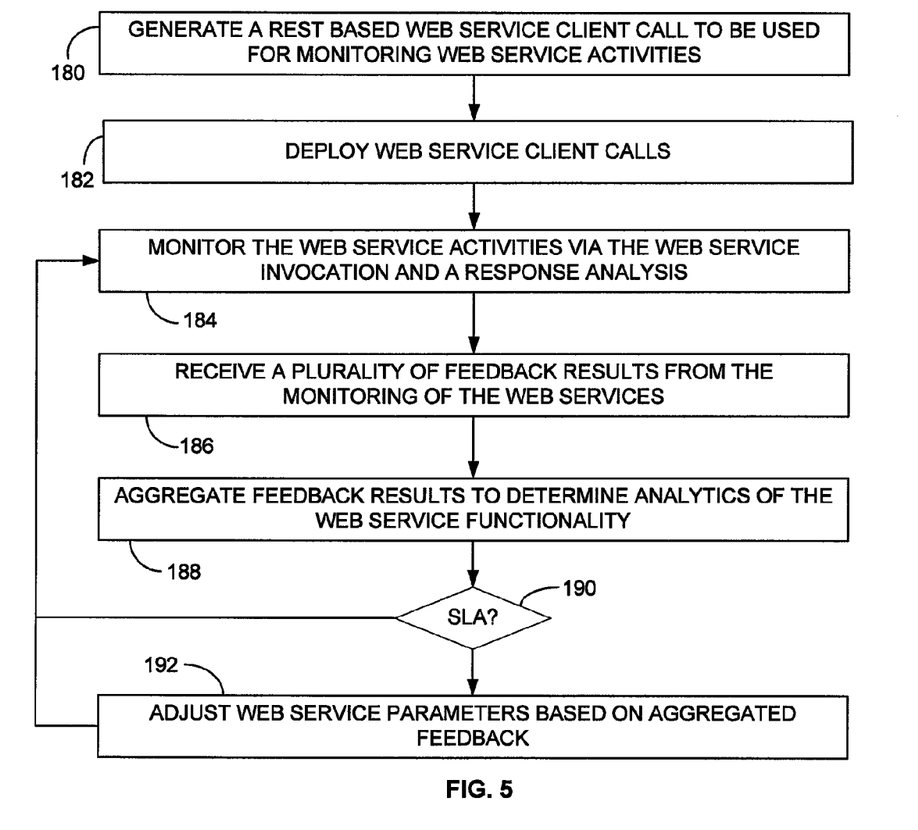
FIG. 5 illustrates a flowchart of the steps of one embodiment of method for monitoring REST web services.

FIG. 5 illustrates a flowchart of the steps of one embodiment of a method for monitoring REST web services. This methodology may be performed via the processing device 170 of FIG. 4 performing processing operations in response to executable instructions 174 received from the storage device 172. With respect to FIG. 1, the system 100 may also perform these processing steps in various components.

A first step, step 180, is to generate a REST based web service client call to be used for monitoring web service activities. With respect to FIG. 1, the web service client call may be generated by the service administrator 124 via the admin interface 118. The client call includes REST-based call requests as described above.

The next step, step 182, is to deploy monitoring calls. With respect to FIG. 1, in one embodiment, this may include service requests 144 provided to the web service (browser) 102 by the test case executor and validator 110. The monitoring calls include instructions, executable by one or more processing components, to receive feedback data usable for determining the operational aspects of the web service in response to the client calls.

A next step, step 184, is to monitor the web service activities via the web service invocation and a response analysis. This monitoring includes the access log processor 104, which gets the requested and expected response details from the access log store.

A next step, 186, is to receive a plurality of feedback results from the monitoring of the web services. With respect to FIG. 1, these feedback results may be received through the test case executor and validator 110, which receives the service response 146 and thereby can measure various metrics of the response of the web service 102 to the service request 144. The feedback may include examining the correctness of a response to a particular call request. In one embodiment, the checking of the correctness of a response may include a non-XML-specific validation technique.

A next step, step 188, is to aggregate the feedback results to determine analytics of the web service functionality. In one embodiment, the analytics may include the measurement of the metric information, such as the responsive time and correctness of the various activities. The metric aspects can be defined by the various components measured relative to the SLA and the metric aspects can also be defined by the service administrator 124, such as through the admin interface 118. In the aggregation of the feedback results, the monitoring database 114 may also make this information available to the monitoring dashboard 120, such as viewable by the service administrator 124, such as in the exemplary screenshot 150 of FIG. 4.

A next step, step 190, is to compare the feedback results to the terms of the service level agreement. This comparison step may be performed again through the dashboard 120 and/or via the admin interface 118. This comparison allows for the direct feedback of the REST web services relative to the defined parameters of the service level agreement made between the service administrator and the service consumer.

If the inquiry to step 190 is in the affirmative, the method reverts back to step 180 for additional monitoring of REST web services. If the inquiry to step 190 is no, the methodology further includes adjusting web service parameters based on aggregated feedback. This adjustment may be made by the service administrator 124 through the admin interface 118, such as adjusting service parameters consistent with performance aspects determined by the above monitoring operations. Upon adjustment of the web service parameters, if any, the method again reverts to step 180 for continued monitoring of REST web service in accordance with the technique described herein.

With respect to FIG. 1, the access log processor 104 may receive or track the service responses and provide the test case information to the monitoring database 114. The monitoring system may then monitor the services, using these test case information, for idempotent behavior and provide feedback to the service administrator, such as via the monitoring dashboard 120, step 186 of FIG. 5.

Thereby, the present system and method uses the above described operations to monitor REST web services. These REST web services can be monitored relative to service level agreements and provide various feedback aspects for all parties involved. The feedback can be used to adjust or otherwise monitor the system itself, as well as to monitor and possibly adjust the terms of a service level agreement. Through this monitoring technique, the ability to provide reliable service consistent with customer expectations or demands is thereby enhanced.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for monitoring REST web services, the method comprising:

retrieving one or more service descriptions for one or more REST web services by a web service provider;

automatically generating one or more REST based web service calls and expected responses to the one or more REST based web service calls from the one or more service descriptions, the one or more REST based web service calls including one or more monitoring calls to create, modify, retrieve, and destroy REST resources associated with the one or more REST web services;

invoking the one or more monitoring calls associated with the one or more REST based web service calls to provide service requests to a client under various load conditions;

monitoring web services activities of the one or more REST web services via the one or more call invocations under the various load conditions;

receiving a plurality of feedback results from the monitoring of the web services activities;

aggregating feedback results and determining therefrom analytics of the one or more REST web services' ability to create, modify, retrieve, and destroy the REST resources, and responsiveness of the one or more REST web services under the various load conditions relative to service level agreements associated with the one or more REST web services; and adjusting web service parameters of the one or more REST web services based on the aggregated feedback results.

2. The method of claim 1 further comprising:

comparing the feedback results to a plurality of terms of the service level agreements.

3. The method of claim 1 further comprising:

conducting an idempotence check using a replay from an access log.

4. The method of claim 1, wherein the one or more REST based web service calls include at least one resource lifecycle including a PUT verb, a GET verb, a POST verb and a DELETE verb.

5. The method of claim 1, wherein the analytics include an equivalence test by format conversion and validations.

6. The method of claim 1, wherein aggregating feedback results includes checking the correctness of a response.

7. The method of claim 6, wherein checking the correctness of a response includes using a non-XML-specific validation technique.

8. Non-transitory computer readable media comprising program code that when executed by a programmable processor causes the processor to execute a method for monitoring REST web services, the computer readable media comprising:

program code for retrieving one or more service descriptions for one or more REST web services by a web service provider;

program code for automatically generating one or more REST based web service calls and expected responses to the one or more REST based web service calls from the one or more service descriptions, the one or more REST based web service calls including one or more monitoring calls to create, modify, retrieve, and destroy REST resources associated with the one or more REST web services;

program code for invoking the one or more monitoring calls associated with the one or more REST based web service calls to provide service requests to a client under various load conditions;

program code for monitoring web services activities of the one or more REST web services via the one or more call invocations under the various load conditions;

program code for receiving a plurality of feedback results from the monitoring of the web services activities;

program code for aggregating feedback results and determining therefrom analytics of the one or more REST web services' ability to create, modify, retrieve, and destroy the REST resources, and responsiveness of the one or more REST web services under the various load conditions relative to service level agreements associated with the one or more REST web services; and program code for adjusting web service parameters of the one or more REST web services based on the aggregated feedback results.

9. The computer readable media of claim 8 further comprising:

program code for comparing the feedback results to a plurality of terms of the service level agreements.

10. The computer readable media of claim 8 further comprising:

program code for conducting an idempotence check using a replay from an access log.

11. The computer readable media of claim 8, wherein the one or more REST based web service calls include at least one resource lifecycle including a PUT verb, a GET verb, a POST verb and a DELETE verb.

12. The computer readable media of claim 8, wherein the analytics include an equivalence test by format conversion and validations.

13. The computer readable media of claim 8, wherein the program code for aggregating feedback results includes checking the correctness of a response.

14. The computer readable media of claim 13, wherein checking the correctness of a response includes using a non-XML-specific validation technique.

15. A system for monitoring REST web services, the system comprising:

a memory device having executable instructions stored therein; and a processing device, in response to the executable instructions, operative to:

retrieve one or more service descriptions for one or more REST web services by a web service provider;

automatically generate one or more REST based web service calls and expected responses to the one or more REST based web service calls from the one or more service descriptions, the one or more REST based web service calls including one or more monitoring calls to create, modify, retrieve, and destroy REST resources associated with the one or more REST web services;

invoking the one or more monitoring calls associated with the one or more REST based web service calls to provide service requests to a client under various load conditions;

monitor web services activities of the one or more REST web services via the one or more call invocations under the various load conditions;

receive a plurality of feedback results from the monitoring of the web services activities;

aggregate feedback results and determine therefrom analytics of the one or more REST web services' ability to create, modify, retrieve, and destroy the REST resources, and responsiveness of the one or more REST web services under the various load conditions relative to service level agreements associated with the one or more REST web services; and adjust web service parameters of the one or more REST web services based on the aggregated feedback results.

16. The apparatus of claim 15, the processing device, in response to executable instructions, further operative to:

compare the feedback results to a plurality of terms of the service level agreements.

17. The apparatus of claim 15 include further executable instructions operative to:
   conduct an idempotence check using a replay from an access log.

18. The apparatus of claim 15, wherein the one or more REST based web service calls include at least one resource lifecycle including a PUT verb, a GET verb, a POST verb and a DELETE verb.

19. The apparatus of claim 15, wherein the analytics include an equivalence test by format conversion and validations.

20. The apparatus of claim 15, wherein aggregating feedback results includes checking the correctness of a response using a non-XML-specific validation technique.

* * * * *